United States Patent

Silverman et al.

(10) Patent No.: US 6,992,120 B2
(45) Date of Patent: *Jan. 31, 2006

(54) COATING COMPOSITIONS

(75) Inventors: Gary S. Silverman, Chadds Ford, PA (US); Michael B. Abrams, Audubon, PA (US)

(73) Assignee: Arkema Inc., Philadelphia, PA (US)

( * ) Notice: Subject to any disclaimer, the term of this patent is extended or adjusted under 35 U.S.C. 154(b) by 424 days.

This patent is subject to a terminal disclaimer.

(21) Appl. No.: 10/280,474

(22) Filed: Oct. 28, 2002

(65) Prior Publication Data

US 2003/0109597 A1   Jun. 12, 2003

Related U.S. Application Data

(60) Provisional application No. 60/338,866, filed on Nov. 13, 2001.

(51) Int. Cl.
*C08L 83/10* (2006.01)
*C09D 5/14* (2006.01)
*C08F 230/08* (2006.01)

(52) U.S. Cl. .................. 523/177; 523/122; 524/431; 524/588; 526/279; 528/26; 106/15.05

(58) Field of Classification Search ................ 523/122, 523/177; 524/431, 588; 526/279; 528/26; 106/15.05

See application file for complete search history.

(56) References Cited

U.S. PATENT DOCUMENTS

| 4,593,055 A | | 6/1986 | Gitlitz et al. |
| 5,436,284 A | | 7/1995 | Honda et al. |
| 5,767,171 A | * | 6/1998 | Matsubara et al. ......... 523/122 |
| 5,795,374 A | | 8/1998 | Itoh et al. |
| 6,767,978 B2 | * | 7/2004 | Aubart et al. ............... 526/245 |

FOREIGN PATENT DOCUMENTS

| EP | 0 775 733 A | 5/1997 |
| EP | 0 714 957 A | 6/1997 |
| EP | 1 127 902 A1 | 8/2001 |
| EP | 1 127 925 A1 | 8/2001 |

* cited by examiner

*Primary Examiner*—Tae H. Yoon
(74) *Attorney, Agent, or Firm*—Thomas F. Roland

(57) ABSTRACT

Copolymers containing trialkylsilylacrylate units are erodible in seawater and can be used to formulate antifouling marine paints. The copolymers are characterized by low levels of silylacrylate component.

7 Claims, 2 Drawing Sheets

COATING COMPOSITIONS

This application claims benefits to Provision No. 60/338,866, filed Nov. 13, 2001.

FIELD OF THE INVENTION

This invention relates to marine antifouling paints which erode at an effective rate. More particularly, the invention relates to a copolymer binder, useful in marine antifouling paints, which contains an aliphalic silylacrylate, notably a trialkylsilylacrylate residue at lower levels than previously believed necessary. The copolymer is characterized by an erosion rate in seawater of about 2 to about 15 µm/month.

BACKGROUND OF THE INVENTION

U.S. Pat. No. 4,593,055 discloses that silylacrylate copolymers of formula

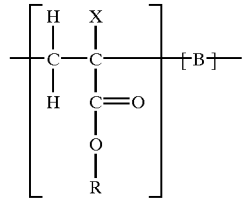

where X is H or $CH_3$

R is selected from the group consisting of

—$SiR'_n R''_{3-n}$ or —$Si(OR'_n R''_{3-n})_3$ wherein R' and R" are independently straight-branched chain alkyl $C_1$–$C_{10}$ or phenyl and n—0–3 are useful to formulate marine antifoulant coatings. The organo silylacrylate component is present in the Examples in an amount of from 20 to 40 mol percent.

U.S. Pat. No. 5,795,374 discloses marine antifoulant paints containing trialkylsilylacrylate units. These units are present in amounts ranging from 30 to 80 weight percent of the copolymer.

U.S. Pat. No. 5,436,284 discloses that copolymers containing silylacrylate units are useful to formulate marine antifoulant coating compositions. The trialkylsilylacrylate copolymers contain from 30 to 60 percent by weight of silylacrylate component.

EP 1 127 925 A1 discloses marine antifoulant paints containing trialkylsilylacrylate groups. The Example illustrating the preparation of Polymer PA4 is a polymer containing 57% by weight of tributylsilylmethacrylate.

EP 1 127 902 A1 discloses that compositions containing trialkylsilylacrylate esters are useful to fabricate marine antifoulant paints. The polymers illustrated in the Examples contain from 25 to 50 mol percent of trialkylsilylacrylate component.

SUMMARY OF THE INVENTION

Figure 1:
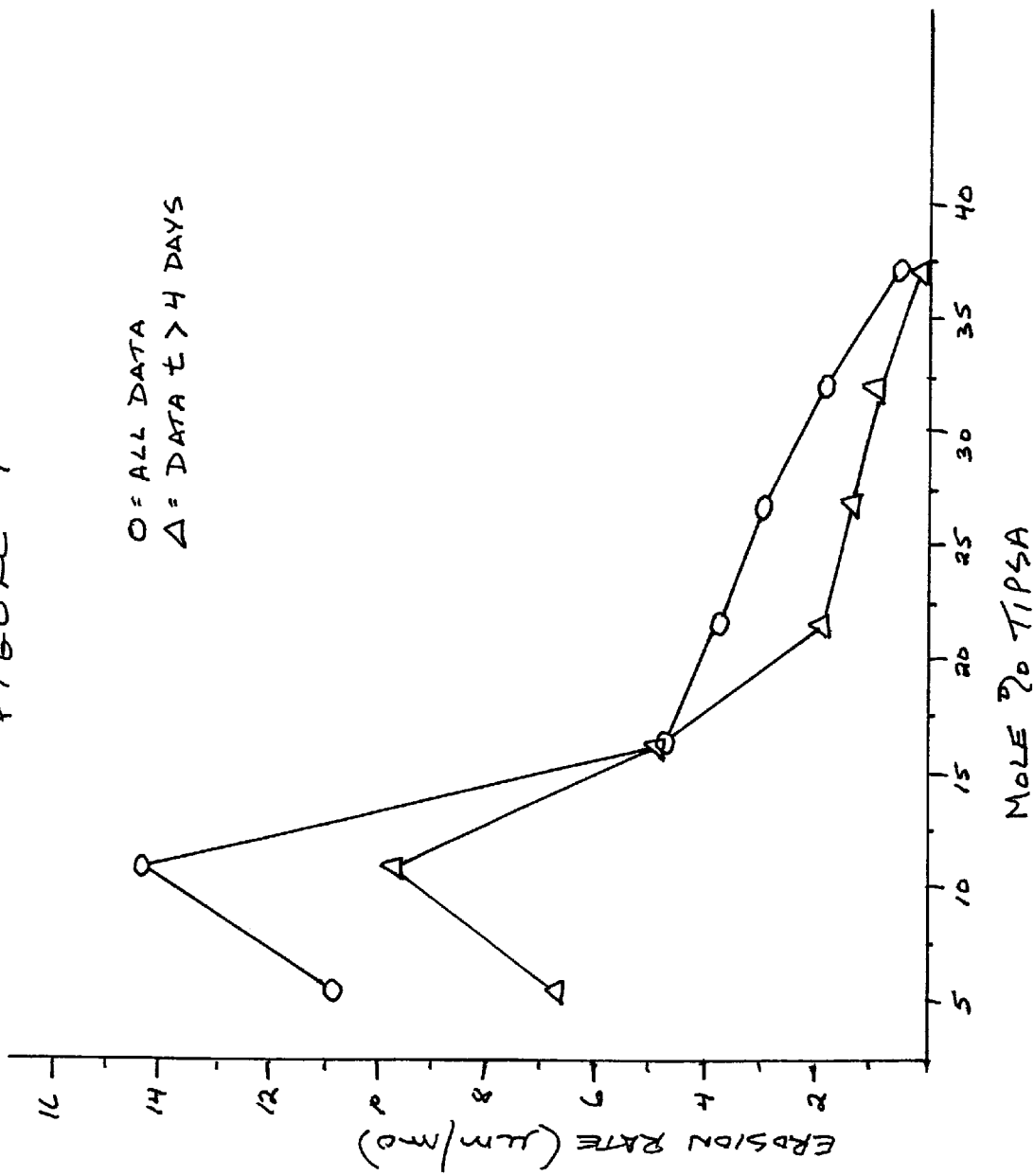
FIG. 1 illustrates the relationship between mole percent silylacrylate residue in a silylacrylate copolymer and the erosion rate in seawater of the copolymer.

The present invention relates to the discovery that aliphatic silylacrylate-containing copolymers, where the silylacrylate component is present at surprisingly low levels, are useful to produce marine antifouling paints that have self polishing properties.

In one aspect, the invention relates to seawater-erodible copolymers comprising the residue of an aliphatic silylacrylate monomer and the residue of one or more ethylenically unsaturated monomers copolymerizable with said silylacrylate monomer characterized by an erosion rate in seawater of 2 to 15 µm/month, wherein the silylacryloyl component represents from 5 to about 22 mol percent of the copolymer.

In another embodiment, the present invention relates to a self-polishing antifoulant marine coating which comprises a silylacrylate copolymer and a toxicant, the silylacrylate copolymer containing from about 5 to about 22 mol percent of silylacryloyl component and characterized by an erosion rate in seawater of front about 2 to about 15 µm/month.

In another embodiment, the invention relates to the improvement in a silylacrylate copolymer wherein the mole percentage of the silylacrylate component is in the range of from about 11 to about 22 mole percent, whereby the erosion rate can be increased by decreasing the mole percentage of the silylacrylate component downward from 22 mole percent.

In one aspect, the invention relates to a seawater-erodible copolymer comprising randomly recurring units of formula

where A represents from 5 to about 22 mol percent of the copolymer and has the formula

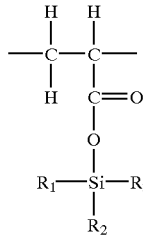

where $R_1$, $R_2$ and $R_3$, each independently, is linear or branched $C_1$–$C_{12}$ alkyl, or $C_3$–$C_{12}$ cycloalkyl or $R_1$, $R_2$ and $R_3$ combine to form part of a $C_3$–$C_{12}$ cycloalkyl;

X is H or $CH_3$ and B represents the residue of one or more ethylenically unsaturated monomers copolymerizable with A, said copolymer characterized by an erosion rate in seawater of from 2 to about 15 Φm/month.

In another aspect, the invention relates to a self-polishing antifoulant marine coating composition comprising a silylacrylate copolymer and a toxicant, the silylacrylate copolymer characterized by an erosion rate in seawater of from about 2 to about 15 µm/month and comprising randomly recurring units of formula.

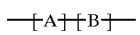

where A is present in an amount of from 5 to about 22 mol percent and has the formula

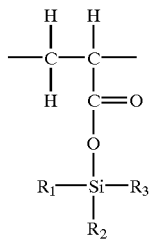

where X is H or $CH_3$;

$R_1$, $R_2$ and $R_3$, each independently, is linear or branched $C_1$ to $C_{12}$ alkyl, or $C_3$ to $C_{12}$ cycloaklyl or $R^1$, $R^2$ and $R^3$ combine to form part of a $C_3$–$C_{12}$ cycloalkyl;

and B is the residue of one or more ethylenically unsaturated monomers copolymerizable with A.

The copolymers of the present invention are prepared by polymerizing a silyl(meth)acrylate monomer with one or more ethylenically unsaturated monomers which are copolymerizable therewith. As used herein the term "silylacrylate" is intended to encompass both silylacrylate and silylmethacrylate. This proposition is reflected by use of the term silyl(meth)acrylate. The same is the case when "silylacroyl" is used. The silyl(meth)acrylate monomer will have the formula

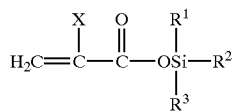

where X is H or $CH_3$ and $R^1$, $R^2$ and $R^3$ each independently is linear or branched alkyl of 1 to 12 carbon atoms or cycloalkyl of 3 to 12 carbon atoms or $R^1$, $R^2$ and $R^3$ combine to form part of a cycloalkyl of 3 to 12 carbon atoms. Examples of alkyl groups include methyl, ethyl, n-propyl, isopropyl, n-butyl, isobutyl, sec-butyl, n-amyl, isoamyl, n-hexyl, n-heptyl, n-octyl, 2-ethylhexyl, n-nonyl, n-decyl, n-undecyl and n-dodecyl. Examples of cycloalkyl groups include cyclopropyl, cyclobutyl, cyclopentyl, cyclohexyl, cyclooctyl and cyclodecyl. Examples of useful trialkylsilylacrylate monomers include those where $R_1$, $R_2$ and $R_3$ are the same:

trimethylsilyl (meth) acrylate, triethylsilyl (meth)acrylate, tri-n-propylsilyl (meth)acrylate, tri-n-butylsilyl (meth) acrylate, tri-n-pentylsilyl (meth)acrylate, tri-n-hexylsilyl (meth)acrylate, tri-n-heptylsilyl (meth)acrylate, tri-n-octylsilyl (meth)acrylate, tri-2-ethylhexylsilyl(meth)acrylate, tri-n-nonylsilyl(meth)acrylate, tri-n-decylsilyl(meth)acrylate, tri-n-undecylsilyl(meth)acrylate, tri-n-dodecylsilyl(meth)acrylate, and aliphatic silyl (meth)acrylates wherein $R^1$, $R^2$ and $R^3$ are partly or entirely different from one another, such as dimethyl-n-propylsilyl (meth) acrylate, isopropyldimethylsilyl (meth) acrylate, di-n-butylisobutylsilyl (meth)acrylate, n-hexyldimethylsilyl (meth)acrylate, sec-butyldimethylsilyl (meth)acrylate, monomethyl-di-n-propylsilyl (meth)acrylate, methylethyl-n-propylsilyl (meth)acrylate. Examples of cycloaliphaticsilyl(meth)acrylate monomers include tri-cyclopropylsilyl(meth)acrylate, cyclobutylsilyl(meth) acrylate, cyclopentylsilyl(meth)acrylate, cyclohexylsilyl (meth)acrylate, and cyclooctylsilyl(meth)acrylate.

Further examples include:

triisopropylsilyl (meth)acrylate, triisobutylsilyl (meth)acrylate and tri-sec-butylsilyl (meth)acrylate, and di-sec-butylmethylsilyl (meth)acrylate, di-sec-butylethylsilyl (meth)acrylate, and isopropyl-sec-butylmethylsilyl (meth)acrylate.

B represents the residue of one or more ethylenically unsaturated monomers copolymerizable with the silylacrylate monomer. The properties of the copolymer can be modified by adding hydrophilic or hydrophilic functionality by way of the monomer or monomers comprising B. Useful monomers include acrylic acid and the acrylic esters such as methylacrylate, ethylacrylate, n-butylacrylate, t-butylacrylate, sec-butylacrylate, 2-ethylhexylacrylate, n-octylacrylate, 2-hydroxyethylacrylate, 2-hydroxypropylacrylate, glycidyl acrylate, 2-methoxyethylacrylate, 2-ethoxyethylacrylate and methacrylic acid and the methacrylic esters such as methylmethacrylate, n-butylethacrylate, t-butylmethacrylate, sec-butylmethacrylate, 2-ethylhexylmethacrylate, cyclohexylmethacrylate, 2-hydroxyethylmethacrylate, 2-hydroxypropylmethacrylate, glycidylmethacrylate, 2-methoxyethylmethacrylate, and 2-ethoxyethylmethacrylate.

Other examples of polymerizable monomers include vinyl esters such as vinyl acetate, vinyl propionate, vinyl butyrate, vinyl benzoate, maleic esters such as dimethyl maleate, diethyl maleate, di-n-propyl maleate, diisopropyl maleate, di-2-methoxyethyl maleate, fumaric esters such as dimethyl fumarate, diethyl fumarate, di-n-propyl fumarate, diisopropyl fumarate, styrene, vinyltoluene, alpha-methylstyrene and acrylonitrile.

The silylacrylate component represents from 5 to about 22 mol percent of the copolymer. This range provides a copolymer having an erosion rate in seawater of from 2 to about 15 μm/month. Preferably, the silylacrylate component is present in an amount of from about 5 to about 17.5 mole percent which provides a copolymer having an erosion rate from about 4 to about 15 μm/month. The silylacrylate and B will be selected and adjusted to provide a copolymer having an erosion rate of from about 2 to about 15 μm/month, preferably from about 2 to about 10 μm/month and optimally from about 4.5 to about 6 μm/month.

From FIG. 1 it is seen that a silylacrylate level of about 11.25 mol percent provides an erosion rate of about 10 μm/month; at this level, the erosion rate can be reduced by increasing or decreasing the mole percent of the silylacrylate component in the copolymer. This proposition is unexpected and totally surprising. In general, the erosion rate is considered to be a function of the amount of hydrolysable monomer in the polymer. Indeed, U.S. Pat. No. 4,593,055, which discloses and claims seawater erodible silylacrylate copolymers, teaches at Column 5, lines 43 et seq. that "the superior control of the erosion rate relics, on chemically tailoring the polymer so that it is selectively weakened at certain points pendant to the polymer chain at the paint/water interface. These weak links are slowly attacked by seawater allowing the polymer to gradually become seawater soluble or seawater swellable. This weakens the hydrolyzed surface polymer film to such an extent that moving sea water is able to wash off this layer and thus expose a fresh surface. By way of contrast with the prior art systems, in the system of the present invention the paint is relatively impermeable to seawater until hydrolysis at the outer microlayer takes place. The hydrolyzed microlayer is then sequentially removed by the water "friction".

A portion of the monomeric units are provided with functional groups which provide a site of weakness, that is, sites which tend to hydrolyze in the presence of seawater. The ratio of functionalized monomers to non-functionalized monomers is controlled to provide control of the erosion rate."

The proposition, illustrated in FIG. 1, that at levels below about 22 mol percent of silylacrylate, the erosion rate of a silylacrylate copolymer can be increased by decreasing the level of silylacrylate component is wholly surprising and unexpected.

The copolymers of the present invention will contain from about 5 to about 22 mole percent of silylacrylate component and correspondingly from about 95 to about 78 mole percent of one or more ethylenically unsaturated monomers that are copolymerizable with the silylacrylate monomer.

While the data in the present discussion has focused on erosion rate, the use of low levels of silylacrylate monomers in conjunction with one or more ethylenically unsaturated monomers can be optimized to address other properties such as film lifetime, erosion linearity, ease of processing, ease of formulation, biocide compatibility, shelf-life and economics.

The random silylacrylate copolymer can be obtained by polymerizing the mixture of monomers in the presence of a vinyl polymerization initiator using any of various methods such as solution polymerization, bulk polymerization, emulsion polymerization, and suspension polymerization using methods well known and widely used in the art. In preparing a coating composition from the copolymer, it is advantageous to dilute the copolymer with an organic solvent to obtain a polymer solution having a convenient viscosity. For this, it is desirable to employ the solution polymerization method or bulk polymerization method.

Examples of vinyl polymerization initiators include azo compounds such as azobisisobutyronitrile and triphenylmethylazobenzene. The azobisnitriles are efficient sources of free radicals for vinyl polymerization and can be used in bulk, solution, emulsion and suspension polymerizations. In addition to 2,2'-azobis (isobutyronitrile), other members of the class include 2,2'-azobis(2-methylbutanenitrile), 2,2'-azobis(2,4-dimethylpentanenitrile), 1,1'-azobis(cyanocyclohexane) and 2,2'-azobis(4-methoxy-2,4-dimethylpentanenitrile). In addition, one can use peroxides such as benzoyl peroxide, di-t-butyl peroxide, t-butyl peroxybenzoate, and t-butyl peroxyisopropylcarbonate.

Examples of useful organic solvents include aromatic hydrocarbons such as xylene and toluene, aliphatic hydrocarbons such as hexane and heptane, esters such as ethyl acetate and butyl acetate, alcohols such as isopropyl alcohol and butyl alcohol, ethers such as dioxane and diethyl ether, and ketones such as methyl ethyl ketone and methyl isobutyl ketone. The solvents are used either alone or in combination.

The molecular weight of the silylacrylate copolymer thus obtained is desirably in the range of from 1,000 to 150,000, preferably from 20,000 to 100,000 in terms of weight-average molecular weight. Too low or too high molecular weight copolymers create difficulties in forming normal coating films. Too high molecular weights result in long, intertwined plymers chains that do not perform properly and that result in viscous solutions that need to be thinned with solvent so that a single coating operation results in a thin coating film. Too low molecular weight polymers require multiple coating operations and provide films that may lack integrity and do not perform properly. It is advantageous that the viscosity of the solution of the copolymer is 150P or lower at 25° C. For attaining this, it is preferred to regulate the solid content of the polymer solution to a value in the range of from 5 to 90% by weight, desirably from 15 to 85% by weight.

The toxicant used in the coating composition of the present invention may be any of a wide range of conventionally known toxicants. The known toxicants are roughly divided into inorganic compounds, metal-containing organic compounds, and metal-free organic compounds.

Examples of the inorganic compounds include copper compounds such as cuprous oxide, copper powder, copper thiocyanate, copper carbonate, copper chloride, and copper sulfate, zinc sulfate, zinc oxide, nickel sulfate, and copper-nickel alloys.

Examples of the metal-containing organic compounds include organocopper compounds, organonickel compounds, and organozinc compounds. Also usable are maneb, manzeb, propineb, and the like. Examples of the organocopper compounds include oxine copper, copper nonylphenolsulfonate, copper bis (ethylenediamine) bis (dodecylbenzenesulfonate), copper acetate, copper naphthenate, and copper bis (pentachlorophenolate). Examples of the organonickel compounds include nickel acetate and nickel dimethyldithiocarbamate. Examples of the organozinc compounds include zinc acetate, zinc carbamate, zinc dimethyldithiocarbamate, zinc pyrithione, and zinc ethylenebis (dithiocarbamate).

Examples of the metal-free organic compounds include N-trihalomethylthiophtalimides, dithiocarbamic acids, N-arylmaleimides, 3-(substituted amino)-1,3-thiazolidine-2,4-diones, dithiocyano compounds, triazine compounds, and others.

Examples of the N-trihalomethylthiophthalimides include N-trichloromethylthiophthalimide and N-fluorodichloromethylthiophthalimide. Examples of the dithiocarbamic acids include bis(dimethylthiocarbamoyl) disulfide, ammonium N-methyldithiocarbamate, ammonium ethylenebis(dithiocarbamate) and milneb.

Examples of the N-arylmaleimides include N-(2,4,6-trichlorophenyl)maleimide, N-4-tolylmaleimide, N-3-chlorophenylmaleimide, N-(4-n-butylphenyl)maleimide, N-anilinophenyl)maleimide, and N-(2,3-xyxyl)-maleimide.

Examples of the 3-(substituted amino)-1,3-thiazolidine-2,4-diones include 3 benzylideneamino-1,3 thiazolidine-2,4-dione, 3-4(methylbenzylideneamino)1,3-thiazolidine-2,4-dione, 3-(2-hydroxybenzylideneamino-1,3-thiazolidine-2,4-thiazolidine-2,4-dione, 3-(4-dichlorobenzylideneamino)-1,3-thiazolidine-2,4-dione and 3-(2,4-dichlorobenzylideneamino-1,3-thiazolidine-2,4-dione.

Examples of the dithiocyano compounds include dithiocyanomethane, dithiocyanoethane, and 2,5-dithiocyanothiophene. Examples of the triazine compounds include 2-methylthio-4-t-butylamino-6-cyclo-propylamino-s-triazine.

Other examples of the metal-free organic compounds include 2,4,5,6-tetrachloroisophthalonitrile, N,N-dimethyl-dichlorophenylurea, 4,5-dichloro-2-n-octyl-4-isothiazoline-3-one, N,N-dimethyl-N'-phenyl-(N-fluorodichloromethylthio)sulfamide, tetramethylthiuram disulfide, 3-iodo-2-propylbutyl carbamate, 2-(methoxycarbonylamino)

benzimidazole, 2,3,5,6-tetrachloro-4-(methylsulfonyl) pyridine, diiodomethyl-p-tolyl sulfone, bis (dimethylcarbamoyl)zinc ethylene bis(dithiocarbamate), phenyl(bispyridine)bismuth dichloride, 2-(4-thiazolyl)benzimidazole, and pyridine triphenylborane.

One or more toxicants, which may be selected from the foregoing toxicants, can be employed in the antifoulant coating composition. The toxicant is used in an amount from 0.1 to 80% by weight, preferably from 1 to 60% by weight of the coating composition. Too low toxicant levels do not produce an antifouling effect, while too large a toxicant level results in the formation of a coating film which is apt to develop defects such as cracking and peeling, thereby becoming less effective.

Additive ingredients may optionally be incorporated into the coating composition of the present invention. Examples of such additive ingredients are colorants such as pigments (e.g., red iron oxide, zinc oxide, titanium dioxide, talc), and dyes, dehumidifiers, and additives ordinarily employed in coating compositions as antisagging agents, antiflooding agents, antisettling agents, and antifoaming agents.

For applying antifoulant coating compositions made from the silylacrylate copolymers of the present invention onto the surface of a structure to be submerged in seawater, use may be made of a method in which the coating composition is applied on the surface in a suitable manner and the solvent is removed by evaporation at ordinary temperature or with heating. By this method, a dry coating film can be easily formed on the surface of the structure.

The antifoulant coating composition of the present invention can be applied to objects required to be protected against the fouling or damage caused by marine organisms, such as ship bottoms, fishing nets, and underwater structures including cooling water pipes, and is also usable for the prevention of sludge diffusion in marine construction works. In such applications, the antifoulant coating composition undergoes neither cracking nor peeling, shows moderate hydrolyzability to dissolve into the seawater constantly at adequate rate, and is hence capable of affording long-lasting excellent protection against the fouling or damage caused by marine organism attachment.

General Polymerization Procedure

A mixture of xylene and 2,2'-azobis(isobutyronitrile), a polymerization initiator, were injected into a microreactor equipped with a condenser, an inert gas/vacuum line connector, two variable speed syringe pumps, septum inlet, temperature control at ∀2° C. and mechanical agitation. The xylene-initiator mixture was heated to 86° C. over 35 minutes and held at that temperature for 10 minutes, whereupon the syringe pumps were turned on and the monomers were added over a period of 1 hour. The reaction mixture was held at 86° C. for an additional 3 hours, whereupon the temperature was raised to 110° C. and held at this level for 15 minutes, whereupon the heating was discontinued and the reactor was allowed to cool to room temperature. The monomers in this experiment were triisopropylsilylacrylate (TIPSA) and methylmethacrylate (MMA). The compositions and analytical data are summarized in Table 1 below.

TABLE 1

| Mole % TIPSA | Mole % MMA | Monomer/ Initiator (Mol %) Ratio | wt % solution | Mw | Mw/Mn |
|---|---|---|---|---|---|
| 5.5 | 94.5 | 216 | 50.0 | 67000 | 2.3 |
| 10.9 | 89.1 | 217 | 50.5 | 69000 | 2.2 |
| 16.2 | 83.8 | 218 | 50.7 | 68000 | 2.1 |
| 21.5 | 78.5 | 219 | 50.9 | 64000 | 2.1 |
| 26.8 | 73.2 | 220 | 51.1 | 75000 | 2.3 |
| 32.0 | 68.0 | 221 | 51.2 | 77000 | 2.3 |
| 37.2 | 62.8 | 222 | 51.3 | 62000 | 2.4 |
| 42.3 | 57.7 | 223 | 51.4 | 65000 | 2.3 |
| 47.3 | 52.7 | 225 | 51.6 | 57000 | 2.2 |
| 47.4 | 52.6 | 225 | 36.4 | 48000 | 2.3 |

Rotor Test

Figure 2:
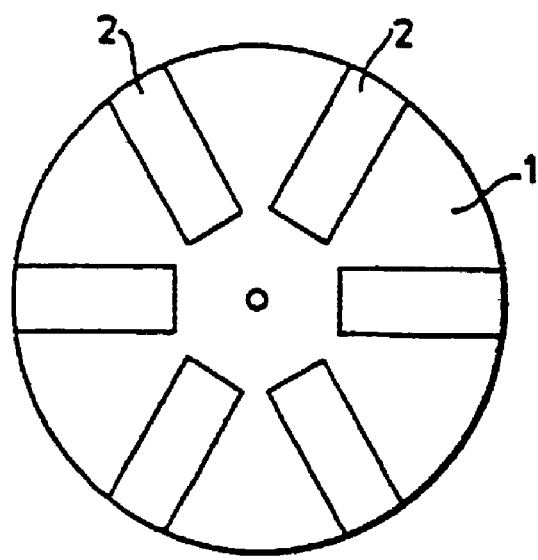
FIGS. 2 and 3 illustrate the apparatus used for the rotor test used to determine the erosion rate.
Figure 3:
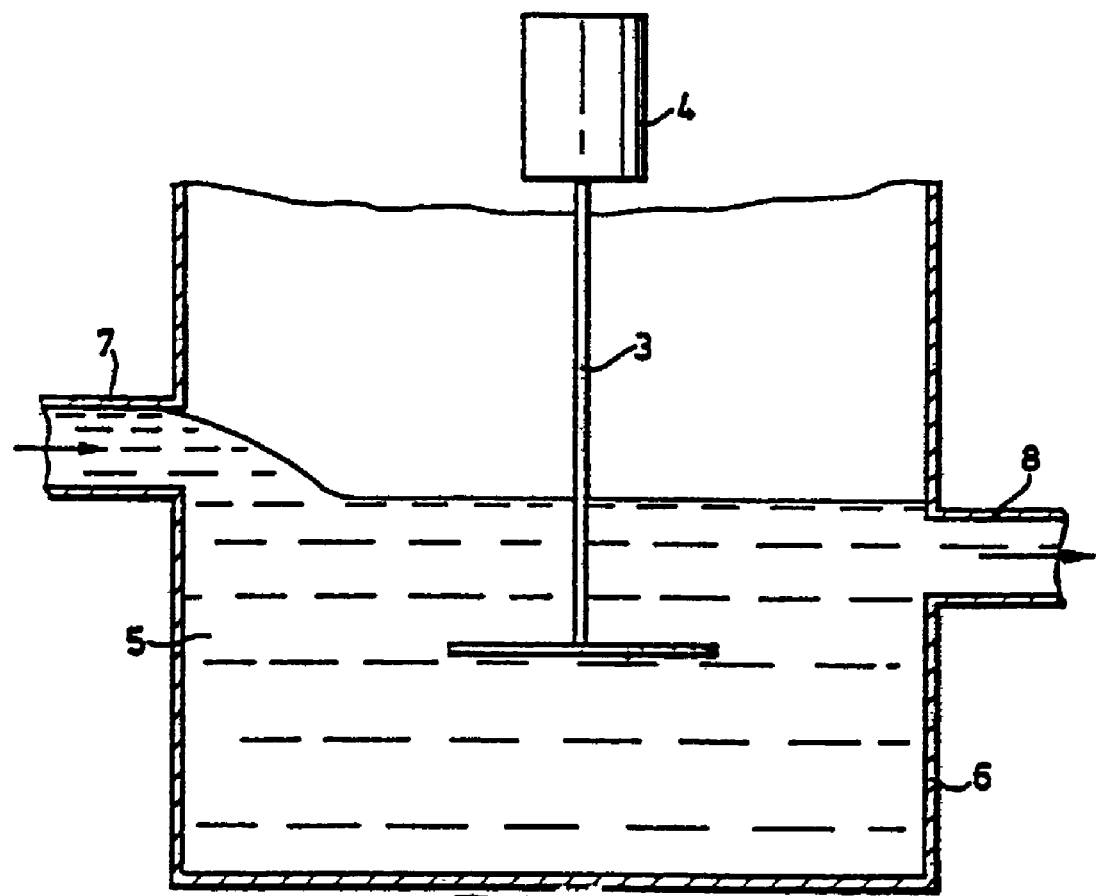

The performance of the copolymers in relatively moving sea-water was tested in the apparatus illustrated schematically in FIGS. 2 and 3 of the drawings. Referring to these Figures, a poly(methylmethacrylate) disc 1 having a diameter of 8 inches was coated with radial stripes 2 with the copolymer under test applied from an applicator adapted to deposit a film of 20 μm thickness. The disc 1 was set aside to dry and the thickness of the stripes 2 was measured by contact profilometry using Tencor Alpha Step 500 Profiler; all should theoretically have been 6¼ μm thick.

The disc 1 was mounted on a shaft 3 driven by an electric motor 4 and immersed in flowing sea-water 5 contained in a vessel 6 having an inlet 7 and an overflow 8. The peripheral speed of the disc 1 was 17 knots and the seawater temperature was maintained at 20 ∀3° C.

During this test, the stripes were planed away from the disc. The rate of removal was measured for each stripe: the plot of this rate against the mole percent TIPSA in the copolymer shows that the rate of erosion of the copolymer increased to a maximum at about 11 mole percent TIPSA and thereafter decreased dramatically.

What is claimed is:

1. A seawater-erodible copolymer comprising repeating units of formula

where A is present in an amount of from 5 to about 22 mole percent of the copolymer and has the formula

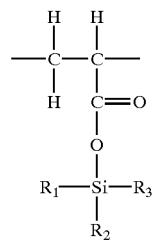

where $R^1$, $R^2$ and $R^3$, each independently is linear or branched alkyl elected from the group consisting of n-propyl, isopropyl, n-butyl, isobutyl, and sec-butyl; X is H or $CH_3$; and B represents the residue of one or more ethylenically unsaturated monomers copolymerizable with A, said copolymer characterized by an erosion rate in seawater of from 2 to 10 μm/month.

2. A self-polishing antifoulant coating composition comprising a silylacrylate copolymer and a toxicant, the copolymer characterized by an erosion rate in seawater of from about 2 to about 10 μm/month and recurring units of formula

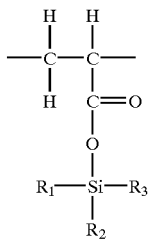

where X is H or $CH_3$, $R^1$, $R^2$ and $R^3$, each independently is linear or branched alkyl selected from the group consisting of n-propyl, isopropyl, n-butyl, isobutyl, and sec-butyl, and further characterized by the presence of the silylacrylate component in an amount of from 5 to about 22 mole percent of the copolymer; and B is the residue of one or more ethylenically unsaturated monomers that are copolymerizable with the silylacrylate monomer.

3. In a seawater-erodible copolymer comprising the residue of a silylacrylate monomer and the residues of one or more ethylenically unsaturated copolymerizable monomers, the improvement which comprises maintaining the level of the silylacrylate component of the copolymer in the range of from about 11 to about 22 mole percent, whereby the erosion rate of the copolymer can be increased by reducing the mole percentage of the silylacrylate component downward from 22 mole percent.

4. A seawater-erodible copolymer comprising from 5 to about 11 mole percent of the residue of a tri(aliphatic)silyl (meth)acrylate monomer and the balance of the copolymer comprising the residues of one or more ethylenically unsaturated monomers copolymerizable with said silyl(meth) acrylate, said copolymer having an erosion rate in seawater of from about 5 to about 15 μm/month, and wherein said aliphatic portion of said tri(aliphatic)silyl(meth)acrylate can be the same or different and is selected from the group consisting of n-propyl, isopropyl, n-butyl, isobutyl, and sec-butyl.

5. A self-polishing antifoulant coating composition comprising the silylacrylate copolymer of claim 1 and a toxicant.

6. A self-polishing antifoulant coating composition comprising the silylacrylate copolymer of claim 3 and a toxicant.

7. A self-polishing antifoulant coating composition comprising the silylacrylate copolymer of claim 4 and a toxicant.

* * * * *